(12) United States Patent
Hiraguchi et al.

(10) Patent No.: US 7,014,136 B1
(45) Date of Patent: Mar. 21, 2006

(54) MAGNETIC TAPE CASSETTE

(75) Inventors: Kazuo Hiraguchi, Kanagawa (JP);
Katsuki Asano, Kanagawa (JP);
Masayoshi Moriwaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 103 days.

(21) Appl. No.: 10/088,230

(22) PCT Filed: Sep. 6, 2000

(86) PCT No.: PCT/JP00/06066

§ 371 (c)(1),
(2), (4) Date: Mar. 19, 2002

(87) PCT Pub. No.: WO01/22418

PCT Pub. Date: Mar. 29, 2001

(30) Foreign Application Priority Data

Sep. 20, 1999 (JP) .................................. 11-265805

(51) Int. Cl.
*G11B 23/087* (2006.01)
(52) U.S. Cl. ...................................... 242/347; 242/341
(58) Field of Classification Search ................ 242/336, 242/341, 345, 346, 347; 360/94, 96.1, 132
See application file for complete search history.

(56) References Cited

U.S. PATENT DOCUMENTS 4,476,505 A * 10/1984 Ogata et al. ................... 360/94
5,316,236 A * 5/1994 Hasegawa et al. .......... 242/336
5,558,291 A * 9/1996 Anderson et al. ........... 242/336

FOREIGN PATENT DOCUMENTS

| JP | 5-347079 A | 12/1993 |
| JP | 189490 | 11/1996 |
| JP | 8-329647 A | 12/1996 |

\* cited by examiner

*Primary Examiner*—Kathy Matecki
*Assistant Examiner*—Scott Haugland
(74) *Attorney, Agent, or Firm*—Sughrue Mion, PLLC

(57) ABSTRACT

The present invention aims to prevent damages of a magnetic tape in a magnetic tape cassette adapted to be operated in a recording and reproducing apparatus which can similarly operate a plurality of magnetic tape cassettes.

More specifically, in the invention, differences (A1–B1, A2–B2) between heights A1, A2 of radially inner portions (32a), (42a) of lower flanges (32), (42) and heights B1, B2 of ribs (35a), (45a) of lower halves (35), (45) for restricting a height of the magnetic tape are equal (A1–B1=A2–B2) in a plurality of the magnetic tape cassettes which have the same vertical sizes and different sizes in a horizontal direction.

13 Claims, 12 Drawing Sheets

FIG. 12 (a) PRIOR ART
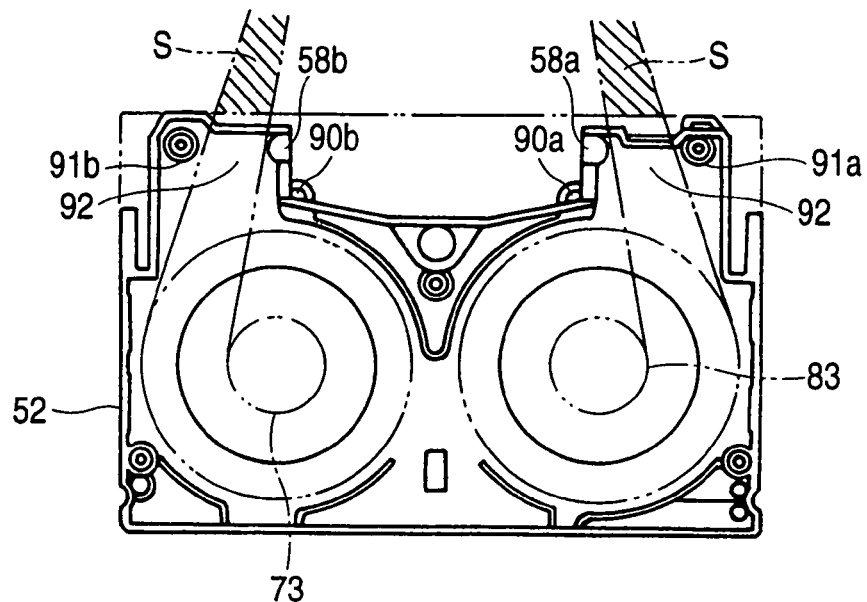
FIG. 12 (b) PRIOR ART
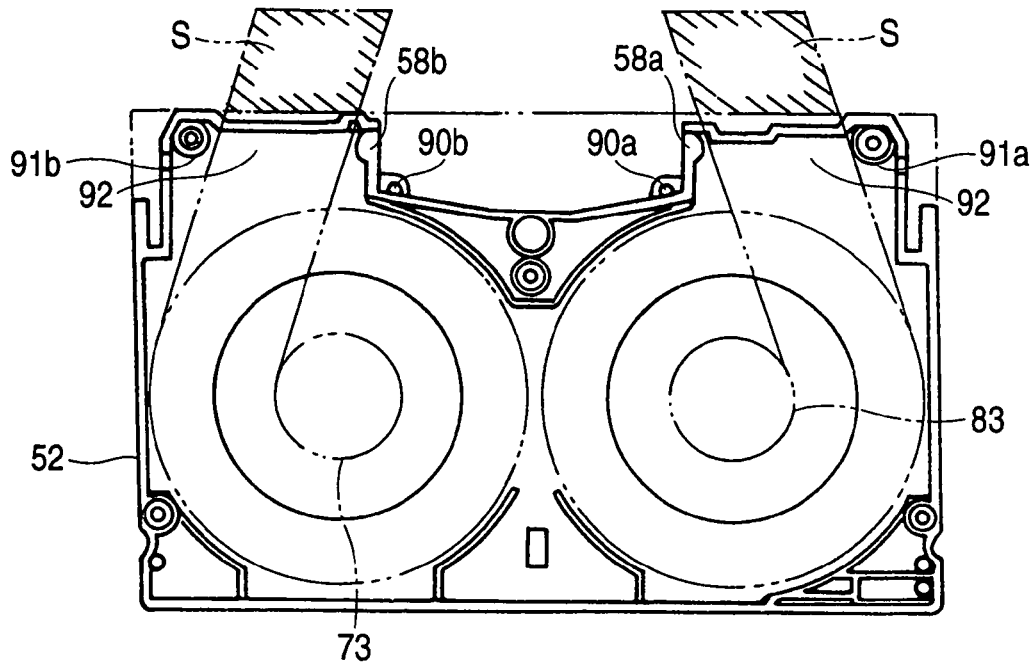

MAGNETIC TAPE CASSETTE

TECHNICAL FIELD

The present invention relates to a magnetic tape cassette such as a digital video cassette (DVC) and so on.

BACKGROUND OF THE INVENTION

As a magnetic recording medium, there has been a magnetic tape cassette having a pair of tape reels, around which a magnetic tape is wound and which is rotatably contained in a cassette case. FIG. 10 is an exploded perspective view of a magnetic tape cassette for a DVC (a digital video cassette) as one example of the magnetic tape cassettes of this type.

As shown in FIG. 10, a cassette case of this magnetic tape cassette 50 is composed of an upper cassette half (hereinafter referred to as an upper half) 51 in a substantially rectangular shape, and a lower cassette half (hereinafter referred to as a lower half) 52. The lower half 52 is formed, at its center part, with two reel holding holes 53a, 53b, and at its front face with a space 54 for inserting a tape withdrawing member which is provided on a recording and reproducing apparatus.

Also, at the front face of the lower half 52, there is formed a lower half portion 55a of a front wall 55 which defines this space 54, and at both sides of the space 54, there are respectively formed cut-outs 57a, 57b for introducing a magnetic tape 56 to the exterior and to the interior. There are further provided tape guides 58a, 58b respectively between ends of the lower half portion 55a of the front wall 55 and the cut-outs 57a, 57b. On the other hand, the upper half 51 is also provided, at its front face, with an upper half portion 55b of the front wall 55 which defines the space 54 for inserting the tape withdrawing member which is provided on the recording and reproducing device.

To the cassette case composed of the above described upper and lower halves 51, 52, is assembled an openable lid 60 so as to cover the magnetic tape 56 which is stretched across the above described space 54, in other words, exposed to the exterior from the cassette case, on such occasion as this cassette case is carried. This openable lid 60 is composed of three lids, namely, an outer lid (a front lid) 61, a top lid (an upper lid) 62, and an inner lid (a rear lid) 63.

Tape reels 70, 80 around which the magnetic tape 56 is wound are contained in the above described cassette case so as to rotate in a state where they are respectively inserted in the above described reel holding holes 53a, 53b. These tape reels 70, 80 are composed of upper flanges 71, 81 and lower flanges 72, 82 restricting vertical movements of the magnetic tape 56, and bosses 73, 83 which are integrally formed with the lower flanges 72, 82 and around which the magnetic tape 56 is wound.

FIG. 11 is an enlarged view of an area surrounding the tape guide 58a. As shown in FIG. 11, the tape guide 58a which is formed between the end of the lower half 55a of the front wall 55 and the cut-out 57a guides the magnetic tape 56. This magnetic tape 56 is wound around the bosses 73, 83 of the magnetic tape reels 70, 80 as described above. When the openable lid 60 is closed, that is, when the magnetic tape 56 is not running for play back or so, positioning of the magnetic tape 56 in a vertical direction is conducted by means of the lower flanges 72, 82 and ribs 59a, 59b which are formed at the front end of the above described lower half 52.

By the way, there exist several magnetic tape cassettes having the above described structure, whose cassette cases are the same in height (size in a vertical direction) and different in size in a horizontal direction. More specifically, in such magnetic tape cassettes, diameters of the tape reels are made different in order to vary winding amounts of the magnetic tapes (duration of recording time), and the tape reels are respectively contained in the cassette cases which are different in size only in a horizontal direction. In order to deal with the magnetic tape cassettes which are different in size in this manner, there are disclosed for example, in registered Japanese Patents Nos. 2636825, 2636826 and so on, such recording and reproducing apparatuses which are capable of operating a plurality of the magnetic tape cassettes in the same manner.

Conventionally, as the magnetic tape cassettes to be loaded in such a recording and reproducing apparatus, there have been a large cassette having a relatively long recording time (hereinafter referred to simply as "an L cassette"), a small cassette having a relatively short recording time (hereinafter referred to simply as "an S cassette"), and a cassette having a medium recording time (hereinafter referred to simply as "an M cassette"). However, they are not so different in size. Therefore, even though a thickness of the cassette case of the L cassette is the same as a thickness of the cassette case of the S cassette, there has been no problem in the L cassette with respect to strength.

In recent years, there has been an increasing need for using a further larger cassette than the above described L cassette (hereinafter referred to simply as "an LL cassette") for the purpose of further increasing the recording time. However, provided that a height of the LL cassette should be maintained to be the same as the height of the above described S and L cassettes while a thickness of the LL cassette is maintained to be equal to the thickness of the other cassettes, there will be arisen such a problem that a flexure may occur in the cassette case, in other words, a problem of strength, because the LL cassette has a larger area in a horizontal direction. For this reason, it is necessary to take such a countermeasure for the LL cassette that the thickness of the cassette case is increased. In this case, if it is intended to ensure an increased amount in size of the thickness of the cassette case by varying the height of the LL cassette, the recording and reproducing apparatus must be inevitably upsized correspondingly, and a problem of an increased cost may be concerned. From this viewpoint, it has been considered that the vertical size of the LL cassette had better be maintained at the same size as it currently stands.

However, when the strength of the cassette case is intended to be ensured by increasing the thickness of the LL cassette without changing the vertical size of the LL cassette, gaps inside the LL cassette will become narrow. On the other hand, because the tape reels are such members as rotating inside the cassette case when driven, the gaps of a certain extent must be maintained between the cassette case and the tape reels so that the rotation may not be hindered.

Therefore, in order to obtain the predetermined gaps between the cassette case and the tape reels, such a method has been considered that a distance between the upper and the lower flanges composing the tape reels may be reduced to such an extent that a lateral size of the magnetic tape may not be interfered, in other words, the lower flanges may be positioned at a higher level and the upper flanges may be positioned at a lower level than in the S cassette and the L cassette. However, as described above, positioning of the magnetic tape cassette in the vertical direction is conducted by means of the lower flanges and the ribs provided at the front end of the lower half. For this reason, by taking this countermeasure, a difference in height between portions where the magnetic tape starts to be wound (radially inner portions of the lower flanges) and tape withdrawing portions (the aforesaid ribs of the lower half) will be too large in the LL cassette. As a result, the tape may be, so to say, slackened when the openable lid is closed, and there has been such probability that edges of the tape may be damaged.

FIG. 12 is a plan view of the lower half 52 of the DVC, in which (a) shows the lower half 52 of the DVC of the M cassette and (b) shows that of the L cassette. A distance between the positioning holes 90a, 90b for positioning them when loaded in the recording and reproducing apparatus, as well as a distance between a pair of the tape guides 58a, 58b provided in forward parts of the cassette are the same both in the M cassette and the L cassette. This is because a recording and reproducing head, tape guide pins, and so on can be co-used with both the cassettes in the recording and reproducing apparatus.

Here in the drawings, hatched areas are tape running areas S in the recording and reproducing apparatus. The L cassette is larger than the M cassette in an outer shape, while distances between the tape guides 58a and 58b are equal in both the cassettes. Bosses 91a, 91b for small screws cooperate with the tape guides 58a, 58b to define tape running openings 92. A width of the tape running opening 92 in the L cassette is larger than that of the tape running opening 92 in the M cassette.

Accordingly, the tape running areas S of the L cassette are larger in width than the tape running areas S of the M cassette in the recording and reproducing apparatus. For this reason, no additional member can be provided in areas corresponding to the tape running areas S of the L cassette in the recording and reproducing apparatus, and so, an effective use of an interior of the recording and reproducing apparatus is impossible.

Moreover, in case where it has become necessary to mount an additional member near the opening of the cassette in the recording and reproducing apparatus, the member must be mounted avoiding the tape running areas S of the L cassette. This will incur upsizing of the recording and reproducing apparatus.

Further, the magnetic tape cassettes are classified into those for personal use and those for business use according to their applications. FIG. 13 is an exploded perspective view showing main components of a beta cam L cassette which is a magnetic tape cassette for business use.

As shown in FIG. 13, this beta cam L cassette 220 is substantially composed of an upper half 224 and a lower half 222 constituting a cassette case, a pair of pay-off and take-up tape reels 228, 230 which are rotatably contained in the upper and lower halves 224, 222 and have a magnetic tape 226 wound around, and a lid 232 for covering front openings of the upper and lower halves 224, 222 so as to be opened and closed.

In addition to the above, there are provided a plurality of small screws 234 for joining the upper and lower halves 224, 222 with each other, a pair of guide rollers 236 and a pair of guide pins 238 made of metal which are arranged at tape pay-off and take-up openings in the lower half 222, and so on. Further, in the drawing, reference numeral 246 represents reel holders arranged on the tape reels 228, 230, reference numeral 248 represents reel springs for biasing the tape reels 228, 230 via the reel holders 246, and reference numeral 250 represents center caps for locking the reel springs 248 from above the upper half 224.

Pads 244 press the magnetic tape 228 with appropriate biasing force by slidably contacting their side faces with a back face of a magnetic tape 228 which passes between the guide rollers 236 and the guide pins 238 at the opening end. A magnetic tape 226 taken out from the cassette 220 is guided by means of a variety of guide pins, which are not shown, in the recording and reproducing apparatus, wound around a head which is not shown, and then, paid off or taken up according to rotation of a capstan motor.

Among the above described various components, the guide rollers 236 are formed of resin molded articles such as POM, for example, which has smoothness and mechanical strength. Moreover, each of the guide rollers 236 is formed in a barrel-like shape in its exterior, as shown in FIG. 14, for the purpose of ensuring safe running of the magnetic tape 226 and guiding it effectively, and supported so as to rotate by idly engaging its center hole 236a with a bearing pin which is projected from the lower half 224.

Generally, on occasion of injection molding of such a molded article, a parting line PL between molds is positioned on an end face of the molded article as shown in FIG. 14. As a result, when it is molded into a barrel-like shape, a larger diameter portion swelling at the middle is made undercut, and the article cannot be extracted in case where it has a larger swelling amount than a certain value. Therefore, it has been usually formed into the barrel-like shape through a cutting work by machine from a rod-like material.

However, in case where the cutting work by machine has been employed, there has been such a problem that cutting amount has been large at both the ends, requiring a lot of working time. In addition, because the work requires an expensive machine such as an NC lathe, a cutting cost would be extraordinary high.

DISCLOSURE OF THE INVENTION

The present invention has been made in view of the above described circumstances, and its object is to prevent damages of a magnetic tape in a magnetic tape cassette to be operated in a recording and reproducing apparatus which can operate a plurality of magnetic tape cassettes in the same manner.

It is another object of the invention to provide a magnetic tape cassette capable of conducting recording and reproducing of cassettes having a plurality of sizes, without upsizing the recording and reproducing apparatus.

It is a further object of the invention to provide a process for producing a guide roller in a magnetic tape cassette, which can be directly molded into a barrel-like shape by injection molding, whose subsequent work is simple, and which can be manufactured at a low cost.

A first invention is to provide a magnetic tape cassette adapted to be operated in a recording and reproducing apparatus which can similarly operate a plurality of magnetic tape cassettes having the same vertical size and different sizes in a horizontal direction, each of the plurality of the magnetic tape cassettes being provided with tape reels having upper and lower flanges for restricting vertical movements of a magnetic tape and bosses around which the magnetic tape is wound, and a cassette case consisting of an upper and a lower halves for rotatably containing the tape reels, the magnetic tape being restricted in height by means of the lower flanges and ribs provided at a front end of the lower half, and further, radially inner portions of the lower flanges of the tape reels in the plurality of the magnetic tape cassettes being respectively set to have different heights, characterized in that differences between the heights of the radially inner portions of the lower flanges and the heights of the ribs in the lower halves for restricting the height of the magnetic tape are the same in the plurality of the magnetic tape cassettes.

According to the magnetic tape cassette of the first invention, provided that the height of the radially inner portion of the lower flanges which are portions where the magnetic tape starts to be wound is A, and the height of the ribs in the lower half which are withdrawing portions of the magnetic tape is B, the difference (A–B) is the same in the magnetic tape cassettes having different sizes (for example, the S cassette, the L cassette, and the LL cassette). Because the difference in the parts for restricting the height of the magnetic tape in the LL cassette is appropriately established in this manner, a certain amount of tension can be obtained.

Accordingly, even in a large cassette, positional restriction of the magnetic tape can be conducted in a stable manner, and damage of the tape edges will be prevented.

A second invention is to provide a magnetic tape cassette characterized in that in a plurality of magnetic tape cassettes which have different outer sizes and are operable in a same recording and reproducing apparatus, distances between positioning marks are equal, that distances between a pair of guide members for defining tape running areas of a pair of tape running openings at inner sides of the cassettes are different, and that tape running paths connecting bosses around which magnetic tapes are wound and the guide members have the same inclinations.

According to the second invention, even in the plurality of the magnetic tape cassettes which have different outer sizes, the tape running areas will not be remarkably enlarged in the recording and reproducing apparatus, even though the outer sizes are increased, because the tape running paths connecting the bosses around which the magnetic tapes are wound and the guide members have the same inclinations. As the results, it will be possible to provide additional members or the like near the tape running openings of the cassettes in the recording and reproducing apparatus. Thus, the recording and reproducing apparatus will not be upsized by providing the members.

Further, a third invention is to provide a magnetic tape cassette characterized in that in a plurality of magnetic tape cassettes which have different outer sizes and are operable in a same recording and reproducing apparatus, distances between positioning marks are equal, that widths of a pair of tape running openings in a horizontal direction of the cassettes are equal, and that distances between a pair of guide members for restricting tape running areas of the tape running openings at inner sides of the cassettes are different.

According to the third invention, even in a plurality of the magnetic tape cassettes which have different outer sizes, the tape running areas will not be remarkably enlarged even though the outer sizes are increased, because the widths of a pair of the tape running openings in a horizontal direction of the cassettes are equal. As the results, it will be possible to provide additional members or the like near the tape running openings of the cassettes in the recording and reproducing apparatus. Thus, the recording and reproducing apparatus will not be upsized by providing the members.

A fourth invention is to provide a process for producing guide rollers in a magnetic tape cassette, the guide rollers being rotatably supported near an inlet and an outlet of a magnetic tape and adapted to guide pay-off and take-up of the magnetic tape, characterized in that each of the guide rollers is a resin molded article having its cylindrical part in a barrel-like shape, and that a parting line between molds for injection molding is positioned at the largest diameter portion of the guide roller to mold it into a barrel-like shape, and thereafter, a molding burr projected from the parting line is removed.

A fifth invention is to provide a process for producing guide rollers in a magnetic tape cassette, the guide rollers being rotatably supported near an inlet and an outlet of a magnetic tape and adapted to guide pay-off and take-up of the magnetic tape, characterized in that each of the guide rollers is a resin molded article having its cylindrical part in a barrel-like shape, and that a parting line between molds for injection molding is positioned at both ends of the guide roller to mold it into a barrel-like shape, and thereafter, a molding burr projected from the parting line is removed.

According to the production process of the above described fourth invention, as a first step, the parting line between the molds for injection molding is positioned at the largest diameter portion, for example in the center part of the guide roller in a barrel-like shape. By filling molten resin into cavities in this state and molding, the guide roller is molded into a barrel-like shape. Thereafter, the molding burr projecting from the parting line is removed.

According to the production process of the above described fifth invention, as a first step, the parting line between the molds for injection molding is positioned at both the ends of the guide roller. By filling molten resin into cavities in this state and molding, the guide roller is molded into a barrel-like shape. Thereafter, the molding burr projecting from the parting line is removed.

Accordingly, in the production processes of the fourth and fifth inventions, undercuts will not occur in molding the guide roller into the barrel-like shape. In the subsequent process, the molding burr slightly projecting from an outer periphery of the product may be only removed, and the subsequent process will be finished simply and in a short time.

BRIEF DESCRIPTION OF THE DRAWINGS

FIGS. 12 (a) and 12 (b) are plan views of a lower half of the conventional magnetic tape cassette.

BEST MODE FOR CARRYING OUT THE INVENTION

Figure 1:
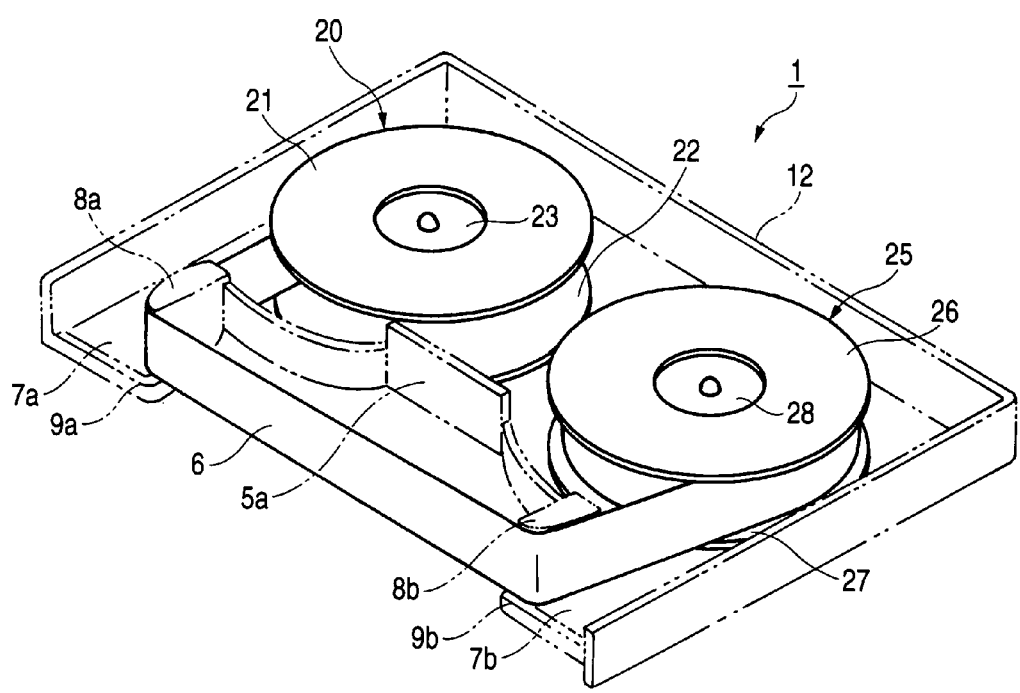
FIG. 1 is a perspective view showing relation between tape reels and a lower half in a first embodiment of the invention (The lower half is simplified).

Herein below, a first embodiment of the invention will be described in detail referring to FIGS. 1 to 3. FIG. 1 is a perspective view showing relation between tape reels and a lower half in a first embodiment of the invention (The lower half is simplified), FIG. 2 is a sectional view of a cassette case and one of the tape reels contained in the cassette case, and FIG. 3(a) is a sectional view of a cassette case of an L cassette and one of the tape reels contained in the cassette case, and FIG. 3(b) is a sectional view of a cassette case of an LL cassette and one of the tape reels contained in the cassette case.

As shown in FIG. 1, a magnetic tape cassette 1 of the embodiment has a pair of tape reels 20, 25 in a cassette case consisting of an upper and a lower halves. These tape reels 20, 25 respectively have upper flanges 21, 26 in a substantially disc-like shape for restricting vertical movements of a magnetic tape 6, lower flanges 22, 27, and bosses 23, 28 which are integrally formed with the lower flanges 22, 27 and around which the aforesaid magnetic tape 6 is wound. The upper flanges 21, 26 and the bosses 23, 28 of the tape reels 20, 25 are fixed by engaging weldable ribs formed on top ends of the bosses 23, 28, which are not shown, respectively with holes formed in the upper flanges 21, 26, which are not shown, and by ultrasonic welding the aforesaid weldable ribs.

The lower half 12 constituting a half body of the aforesaid cassette case is provided with a lower half 5a of a front wall, cut-outs 7a, 7b through which the magnetic tape 6 is guided in and out, and tape guides 8a, 8b which are formed between ends of the lower half 5a and the cut-outs 7a, 7b. These tape guides 8a, 8b are adapted to come into a sliding contact with the magnetic tape 6 while the magnetic tape cassette 1 is played back or so, to guide the magnetic tape 6 under a certain tension. Positioning of this magnetic tape 6 in a vertical direction is performed by means of the lower flanges 22, 27 and ribs 9a, 9b which are formed at a front end of the lower half 12, while an openable lid is closed, in other words, the magnetic tape 6 is not running for playback or so.

Figure 2:
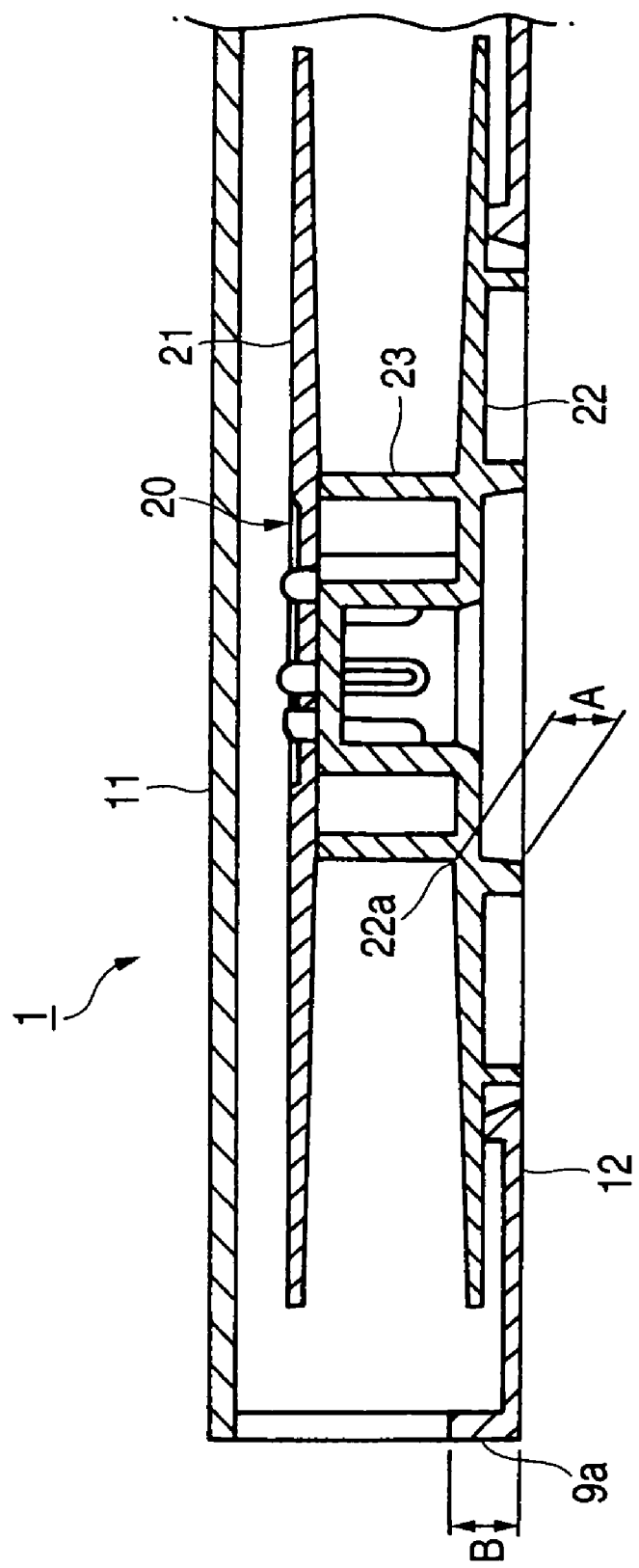
FIG. 2 is a sectional view of a cassette case and one of the tape reels contained in the cassette case.
Figure 3:
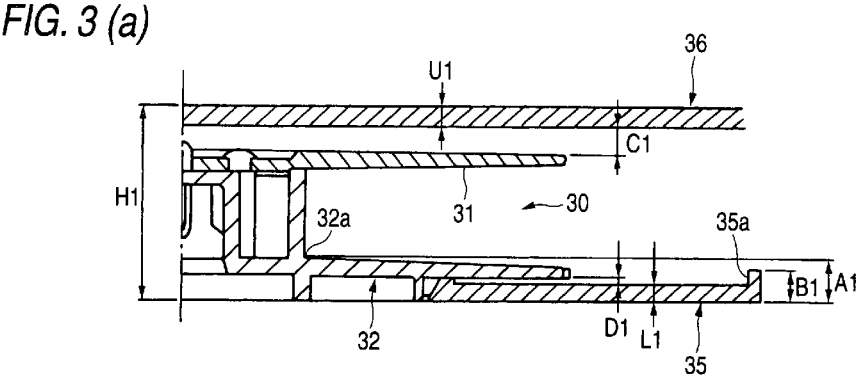
FIG. 3(a) is a sectional view of a cassette case of an L cassette and one of the tape reels contained in the cassette case.
FIG. 3(b) is a sectional view of a cassette case of an LL cassette and one of the tape reels contained in the cassette case.
Figure 3:
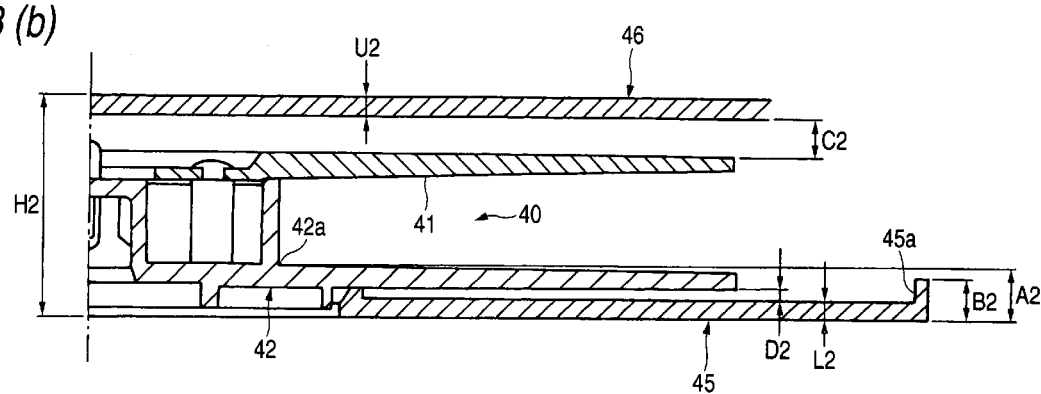

As shown in FIG. 2, a height of a radially inner portion 22a of the lower flange 22 is set to be A. Here, the height A means a distance from a surface of the lower half 12 (a face in contact with a table) to the radially inner portion 22a of the lower flange 22 (a rectilinear distance in parallel to an axis of rotation of the tape reel 20), when the magnetic tape cassette 1 is placed on the table, for example.

Moreover, a height of the rib 9a of the lower half 12 which is a withdrawing portion of the magnetic tape 6 is set to be B. Here, the height B means a distance from the surface of the lower half 12 (the face in contact with the table) to an upper end of the rib 9a (a rectilinear distance in pararell to the axis of rotation of the tape reel 20). Moreover, although there are shown only the tape reel 20 and a half of the lower half 12 in FIG. 2, the relation as described below is the same with the other tape reel 25 and the other half of the lower half.

A difference (A–B) between the height A of the radially inner portion 22a of the aforesaid lower flange 22 and the height B of the rib 9a of the lower half 12 is set to be equal in a plurality of magnetic tape cassettes having different sizes, for example, the S cassette, L cassette and LL cassette.

More specifically, when a height A1 of a radially inner portion 32a of a lower flange 32 provided in the L cassette as shown in FIG. 3(a) is 10 mm, for example, and a height B1 of a rib 35a of a lower half 35 is 9 mm, for example, a height A2 of a radially inner portion 42a of a lower flange 42 provided in the LL cassette as shown in FIG. 3(b) is set to be 12 mm, for example, and a height B2 of a rib 45a of a lower half 45 is set to be 11 mm, for example. In short, A1−B1=A2−B2=1 mm, which is the same in the L cassette and the LL cassette. By setting the difference in this manner, the difference in parts for restricting the height of the magnetic tape in the LL cassette is not different from the difference in the L cassette, and therefore, even in the LL cassette, a certain tension will be created so that the magnetic tape 6 may not be slackened, and positional restriction of the magnetic tape 6 can be performed in a stable manner.

Moreover, in the L cassette and the LL cassette which have an equal size in height, establishing a relation of H1=H2 in short, and have different sizes in a horizontal direction, other dimensional relations are preferably set to be as follows; ≈□.

Relation between a thickness U1 of an upper half 36 and a thickness U2 of an upper half 46 is U1≈U2 (relation U1>U2 to an extremely small extent is preferably established in order to enlarge a gap between a tape reel 40 and the upper half 46 in the LL cassette), and relation between a thickness L1 of the lower half 35 and a thickness L2 of the lower half 45 is L1≈L2 (relation L1>L2 to an extremely small extent is preferably established in order to enlarge a gap between the tape reel 40 and the lower half 45 in the LL cassette). Relation between a distance C1 between the upper half 36 and an upper flange 31 and a distance C2 between the upper half 46 and an upper flange 41 is C1≈C2 (relation C1>C2 to an extremely small extent is preferably established in order to enlarge a gap between the upper flange 41 and the upper half 46 in the LL cassette), and relation between a distance D1 between the lower half 35 and the lower flange 32 and a distance D2 between the lower half 45 and the lower flange 42 is D1≈D2 (relation D1>D2 to an extremely small extent is preferably established in order to enlarge a gap between the lower flange 42 and the lower half 45 in the LL cassette).

Usually, a tape supporting face of the lower flange has a gradient toward an outer circumference of the lower flange, and an effect of this gradient may be concerned. However, because the gradient is very small, and even though a diameter of the lower flange is relatively large, the gradient will be smaller correspondingly, as shown in FIGS. 3(a), (b), it will be sufficient only that the above mentioned relations between the heights A1, A2 and the heights B1, B2 be established as above.

It is to be noted that the invention is not limited to the above described embodiment, but appropriate modifications and improvements are possible. For example, it goes without saying that the invention can be applied to other cassettes than the DVC.

Figure 10:
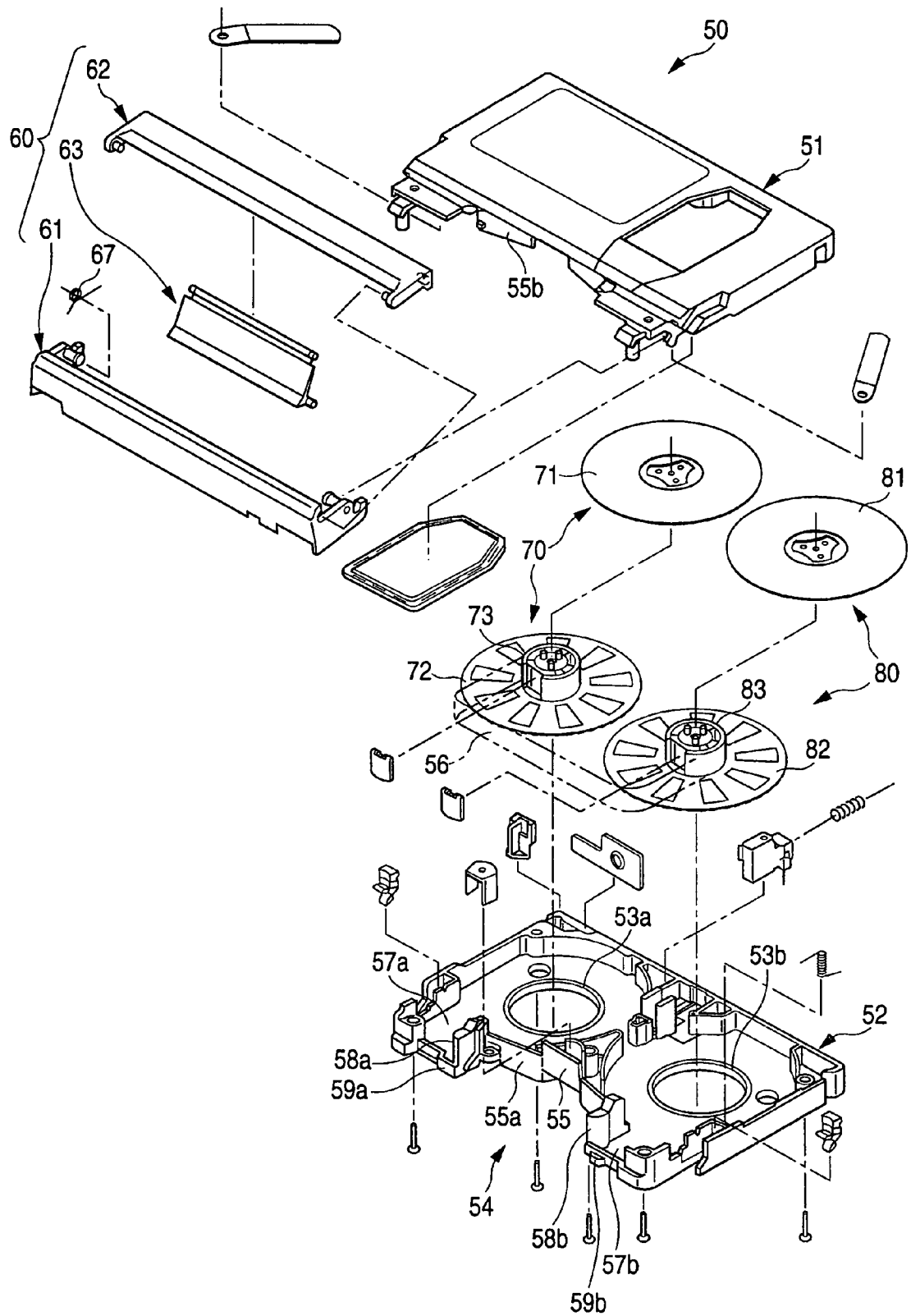
FIG. 10 is an exploded perspective view showing a conventional magnetic tape cassette for a DVC.
Figure 11:
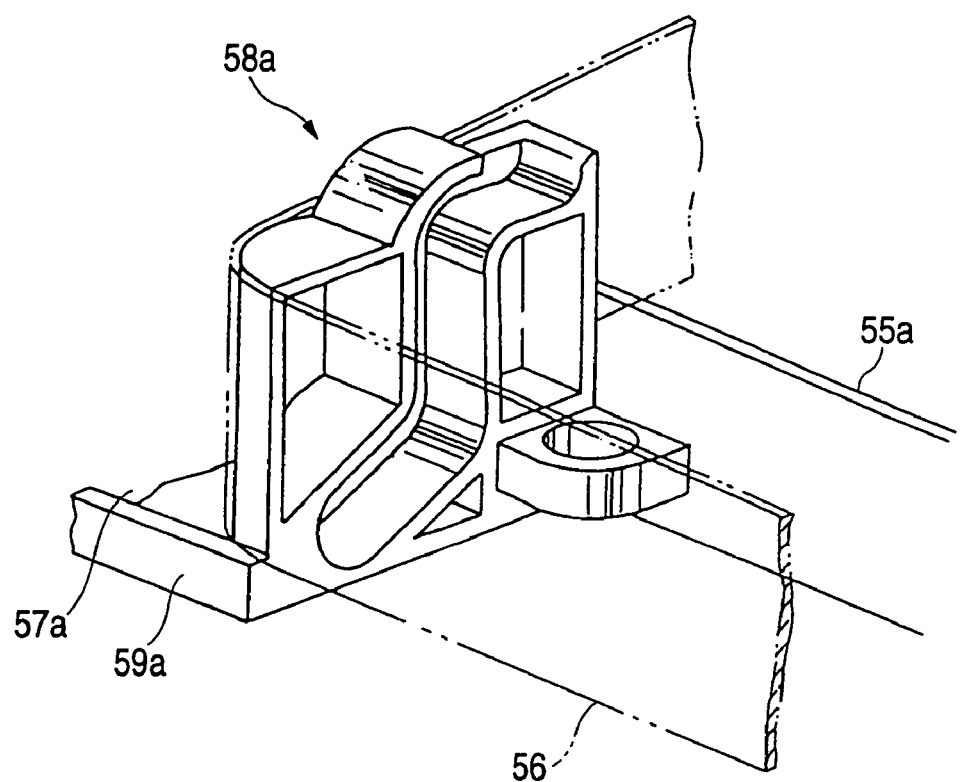
FIG. 11 is an enlarged perspective view showing a tape guide in FIG. 10.
Figure 13:
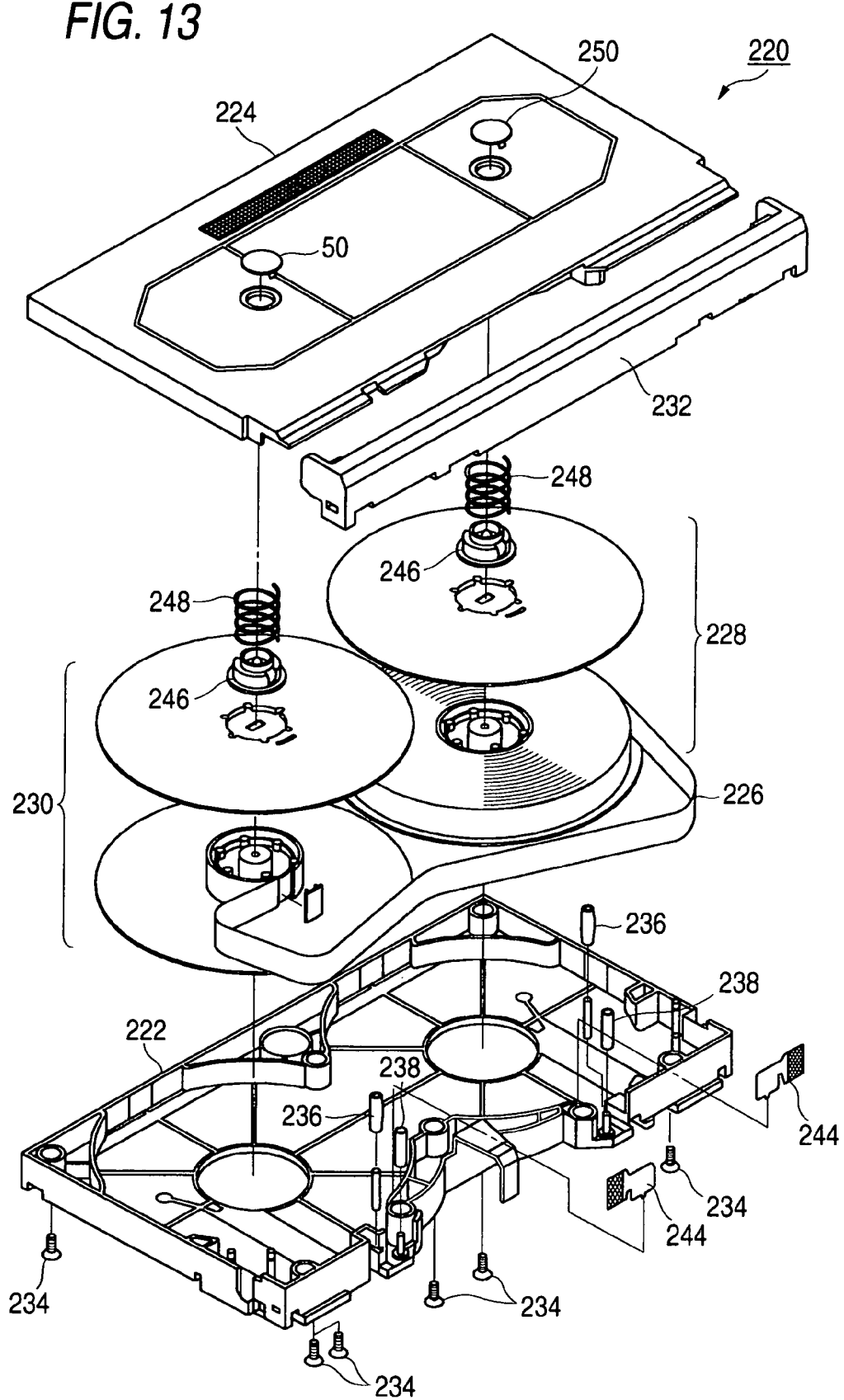
FIG. 13 is an exploded perspective view showing main components of a beta cam L cassette, one example to which the guide roller of the invention is applied.
Figure 14:
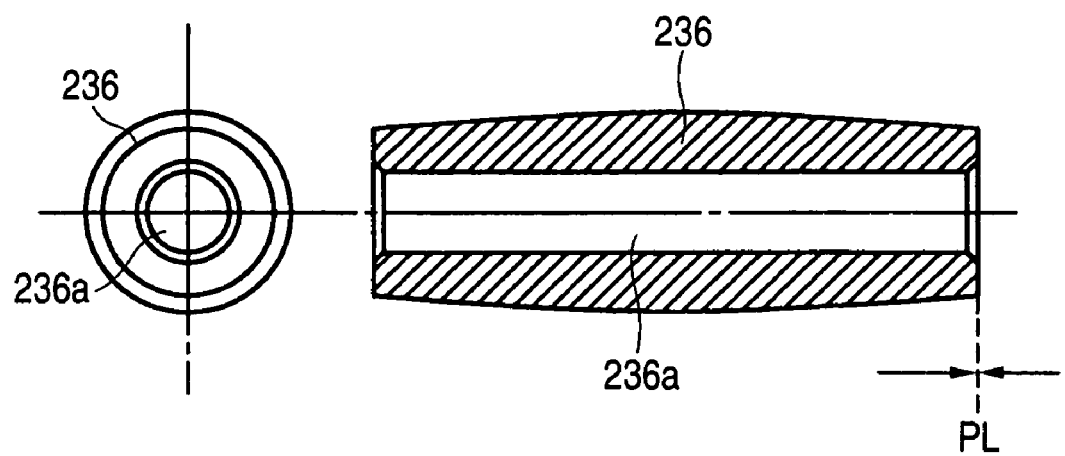
FIG. 14 is a longitudinally sectional view and an end view showing a conventional process for producing a guide roller in a barrel-like shape.

Now, a second embodiment of the invention will be described in detail, referring to FIG. 4. FIG. 4 is a plan view of a lower half of a magnetic tape cassette according to the second embodiment of the invention. Since a basic structure of this second embodiment is the same as that of the conventional magnetic tape cassette as shown in FIG. 10, the same components will be denoted with the same reference numerals, and their explanation will be omitted or simplified.

Figure 4A:
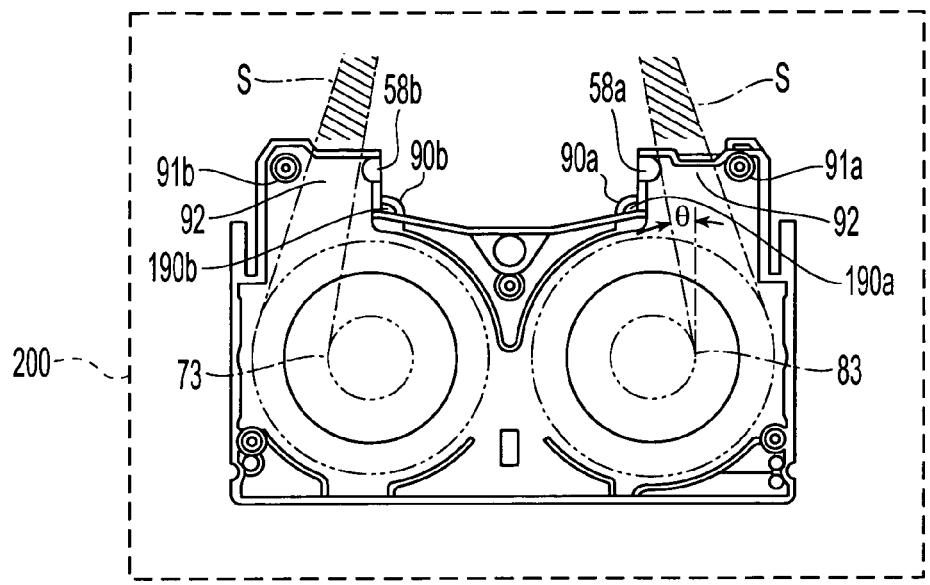
FIG. 4 is a plan view of a lower half of a magnetic tape cassette according to a second embodiment of the intention, in which (a) is the lower half of an M size, and (b) is that of an L size.
Figure 4B:
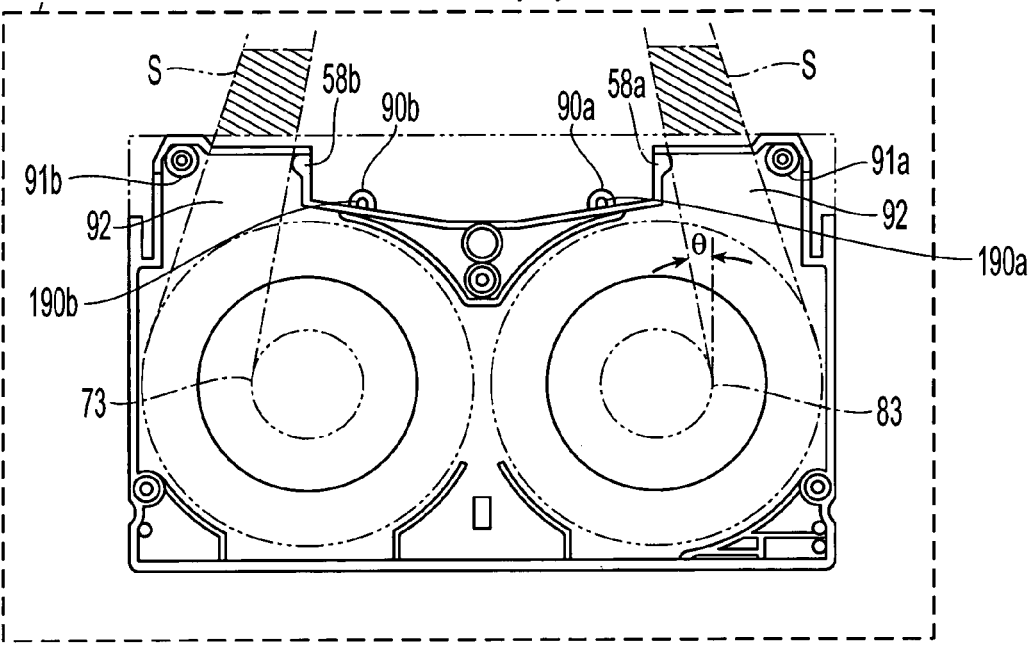

FIG. 4(a) is a lower half of an M cassette, and FIG. 4(b) is a lower half of an L cassette which has a larger outer dimension than the M cassette.

Tape reels 70, 80 of the L cassette are larger than tape reels 70, 80 of the M cassettes and can have a larger amount of a magnetic tape wound around them than in the M cassette. A pair of positioning holes 90a, 90b as targets for positioning the cassette in a recording and reproducing apparatus 200 are provided at a front side of a lower half 52 in each of the cassettes. Distances between the positioning holes are the same in the cassettes of both the sizes, and common positioning pins 190a, 190b in the recording and reproducing apparatus 200 are inserted into the positioning holes 90a, 90b from below the cassette, thereby to position the cassette.

A pair of tape guides 58a, 58b for restricting running areas of a magnetic tape inside the cassette are provided near the positioning holes 90a, 90b. The magnetic tape is adapted to be stretched across the pair of the tape guides 58a, 58b when the cassette is not in use. A distance between the pair of the tape guides 58a, 58b is longer in the L cassette than in the M cassette.

However, relations between bosses 73, 83 of the reels 70, 80 and the tape guides 58a, 58b are the same in the L cassette and the M cassette, and tape running paths connecting the bosses 73, 83 and the tape guides 58a, 58b have the same inclinations θ with respect to a determined direction in both the cassettes. In this embodiment, the inclinations θ with respect to a back and forth direction of the cassettes are the same in both the cassettes.

As the results, although a width of a tape running opening 92 is larger in the L cassette than in the M cassette, the difference is not so large as in the conventional case. Similarly, with respect to tape running areas S in the recording and reproducing apparatus, there is no such a large difference between the L cassette and the M cassette, as in the conventional case. As apparent when FIG. 4(b) is compared with FIG. 12(b), the tape running areas S of the L cassette according to this embodiment in the recording and reproducing apparatus is remarkably narrower than the tape running areas S of the conventional L cassette in the recording and reproducing apparatus.

Therefore, according to this second embodiment, even though the cassette is larger in size, the tape running areas S in the recording and reproducing apparatus will not be increased to a large extent. Thus, spaces near the tape running openings 92 can be effectively utilized, such as arranging additional members near the tape running openings 92.

Now, a third embodiment of the invention will be described.

Figure 5:
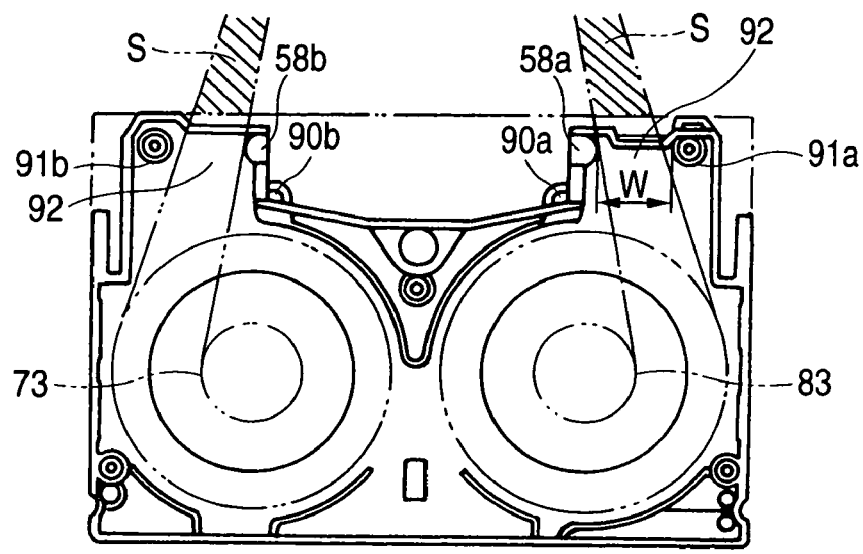
FIG. 5 is a plan view of a lower half of a magnetic tape cassette according to a third embodiment of the intention, in which (a) is the lower half of an M size, and (b) is that of an L size.
Figure 5:
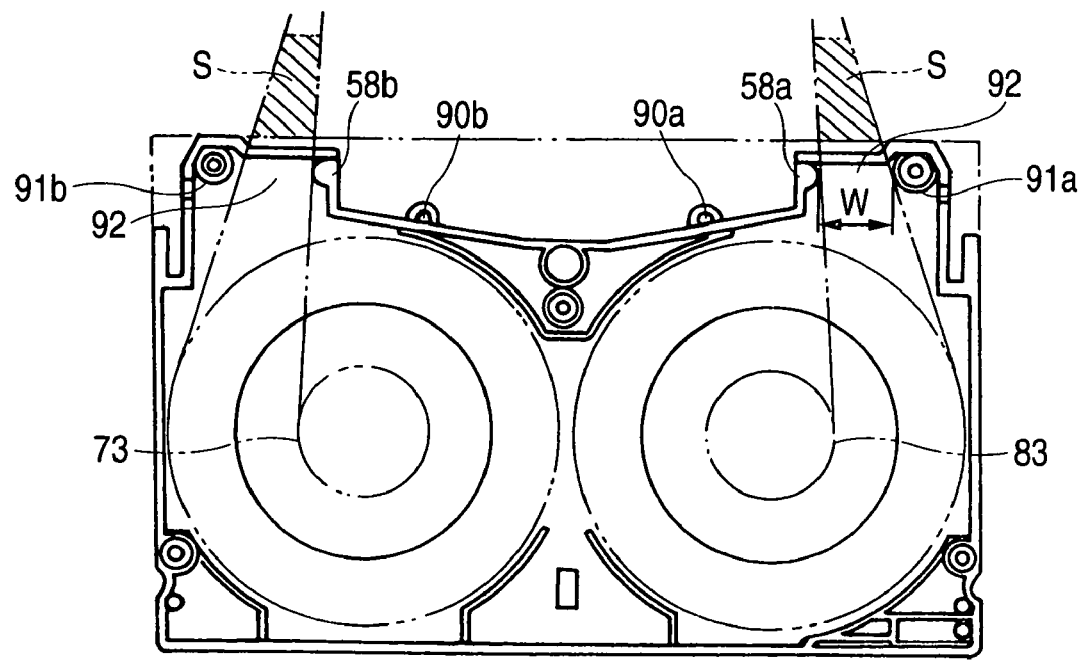

FIG. 5 is a plan view of a lower half of a magnetic tape cassette in the third embodiment according to the invention. Since a basic structure of this third embodiment is the same as that of the above described second embodiment, the same components will be denoted with the same reference numerals and their explanation will be omitted or simplified.

FIG. 5(a) shows a lower half 52 of the M cassette, and FIG. 5(b) shows a lower half 52 of the L cassette.

A characteristic structure of this third embodiment is that widths W of the tape running openings 92 in a horizontal direction of the cassettes are equal irrespective of dimension of the cassettes. Inner sides of the magnetic tape running openings 92 are defined by the tape guides 58a, 58b, and outer sides thereof are defined by bosses 91a, 91b for small screws. The distances W between the tape guides 58a, 58b and the bosses 91a, 91b for the small screws forming the tape running openings 92 are equal in both the cassettes. Moreover, distances between the positioning holes 90a, 90b are equal in both the cassettes, and a distance between the tape guides 58a, 58b in the L cassette is larger than that in the M cassette.

Although the tape running areas S of the L cassette in the recording and reproducing apparatus is larger than those of the M cassette, there is not such a large difference as in the conventional case. As is apparent when FIG. 5(b) is compared with FIG. 12(h), the tape running areas S of the L cassette according to this embodiment in the recording and reproducing apparatus is remarkably narrower than the tape running areas S of the conventional L cassette in the recording and reproducing apparatus.

Therefore, according to the third embodiment, even though the cassette is larger in size, the tape running areas S in the recording and reproducing apparatus will not be increased to a large extent. Thus, spaces near the tape running openings 92 can be effectively utilized, such as arranging additional members near the tape running openings 92.

The invention is not restricted to the above described embodiment, but can be appropriately modified and improved based on the concept of the invention. For example, although the above described embodiment has been described referring to the M cassette and the L cassette, a similar structure is applied to a cassette of an S size for a DVC. In addition, the invention is not restricted to the DVC, but can be applied to any type of magnetic tape cassettes, provided that they may be such magnetic tape cassettes as operable in the same recording and reproducing apparatus, but their recording and reproducing systems, size numbers, etc. are not limited.

Figure 6:
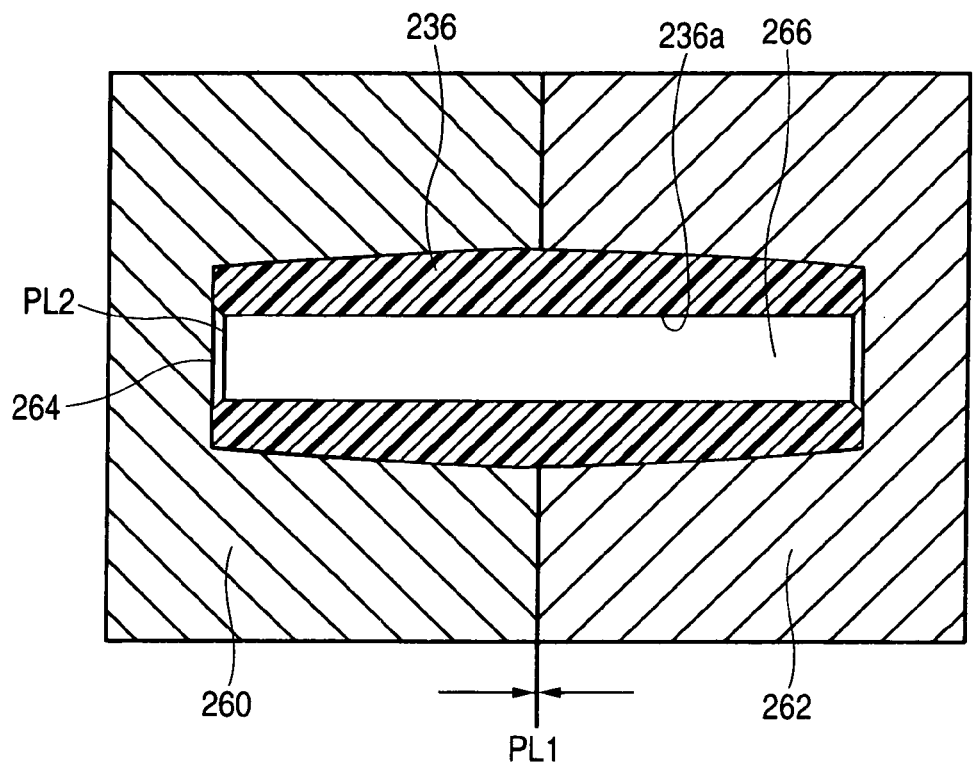
FIG. 6 is a sectional view showing shapes of molds in a fourth embodiment of the invention.

Now a fourth embodiment of the invention will be described in detail referring to FIGS. 6 and 7. FIG. 6 is a sectional view showing shapes of molds in the fourth embodiment of the invention. It is to be noted that because structures of guide rollers and a magnetic tape cassette to which the guide rollers are mounted are similar to the conventional case, their explanation will be omitted.

As shown in FIG. 6, a parting line PL1 between a pair of molds 260, 262 for injection molding (260 is a movable mold, and 262 is a fixed mold) is positioned at a center of a guide roller 236 in a barrel-like shape which is a resin molded article, that is, the largest diameter portion of the guide roller, and the molds are formed in a shape of cavities divided in halves at the center. In the cavities of both the molds 260, 262, portions 264, 266 for forming a pin hole 236a of the guide roller 236 are projected in their respective center parts to be abutted against each other at a position of a parting line PL2. It goes without saying that the parting line PL2 is not limited to the position as shown in the drawing, but can be appropriately changed, for example, to a substantially center part (the same position as the line PL1) or so.

Accordingly, in a state where the molds 260, 262 are abutted against each other, molten resin which has been filled in the cavities through runners and gates formed in the molds 260, 262, although not shown, will be molded into a shape of the cavities. After the resin has been hardened, the movable mold 260 is released from the fixed mold 262, and then, by thrusting a knock-out pin which is not shown, the guide roller 236 molded in the barrel-like shape will be discharged to a position for stocking the products.

Figure 7:
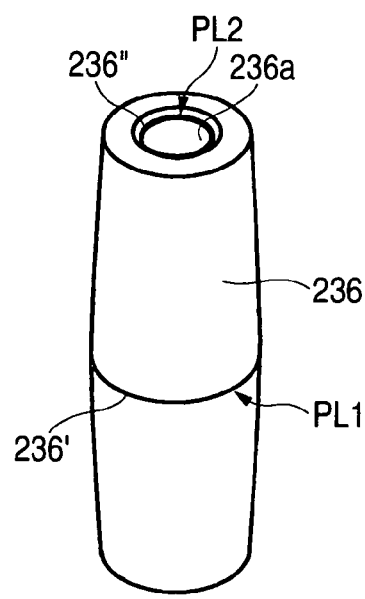
FIG. 7 is a perspective view showing a finished state of a guide roller which has been molded by employing the molds in FIG. 6.

FIG. 7 shows the guide roller 236 which has been molded through the above described injection molding process. The guide roller 236 has been molded substantially into a shape of a finished product having accuracy according to accuracy of the molds and abutting precision, except that a molding burr 236' along the a foresaid parting line PL1 is projected from the center part and another molding burr 236" along the aforesaid paring line PL2 is projected from a tapered edge face at its one end. The first molding burr 236' in a circumferential direction, and the second annular molding burr 236" along the tapered edge will be cut in a subsequent cutting process, and then, the barrel shaped guide roller 236 as the finished product will be obtained.

Figure 8:
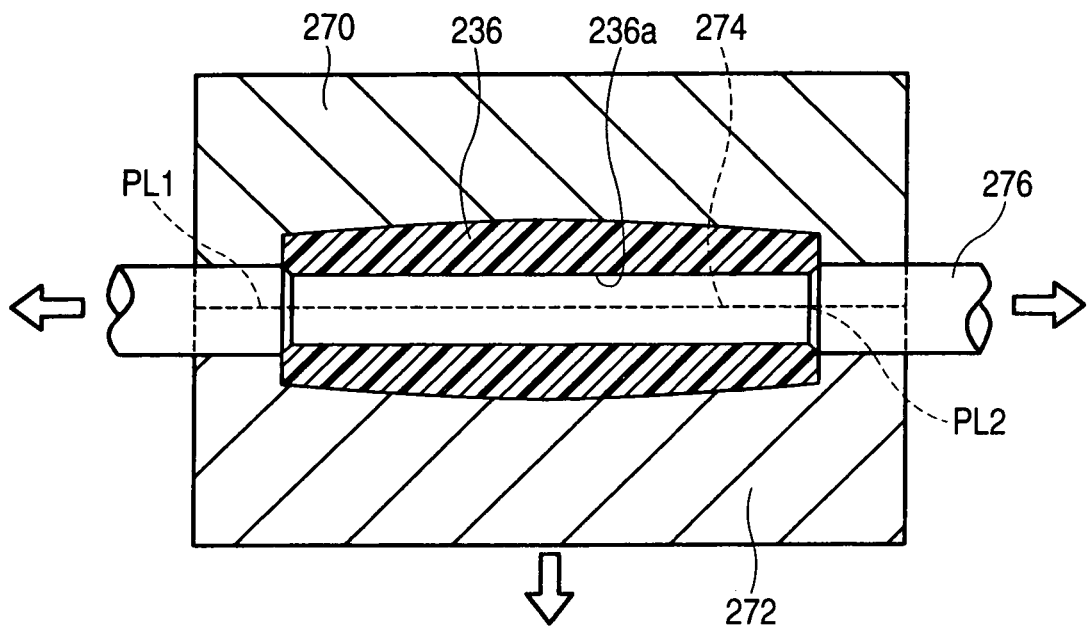
FIG. 8 is a sectional view showing shapes of molds in a fifth embodiment of the invention.

FIG. 8 is a sectional view showing shapes of molds according to a fifth embodiment of the invention. As shown in FIG. 8, a parting line PL1 between a pair of molds 270, 272 for injection molding (270 is a movable mold, and 272 is a fixed mold) is positioned at both ends of a guide roller 236 which is a resin molded article, and the molds are formed in a shape of cavities divided in halves at both the ends. In respective center parts of both the molds 270, 272, a pair of core molds 274, 276 of a sideways extraction type for forming a pin hole 236a of the guide roller 236 are arranged so as to be abutted against each other.

At a parting line PL2 between both the core molds 274, 276, one end of the pin hole 236a is formed as a tapered edge. This allows the core molds 274, 276 to be released without creating an undercut. However, it is needless to say that the parting line PL2 is not limited to the position as shown in the drawing, but can be appropriately changed, for example, to a substantially center part (the same position as the line PL1 in FIG. 6).

Accordingly, in a state where both the molds 270, 272 and the core molds 274, 276 are abutted against each other, molten resin which has been filled in the cavities through runners and gates formed in the molds 270, 272, although not shown, will be molded into a shape of the cavities. After the resin has been cooled, the movable mold 270 is released from the fixed mold 272 as indicated by an arrow, and by separating the core molds 274, 276 from each other, the guide roller 236 molded in a barrel-like shape can be obtained.

It is to be noted that the releasing process of the molds 270 to 274 may be conducted in any order, provided that the molds do not interfere with one another in a direction of extraction.

Figure 9:
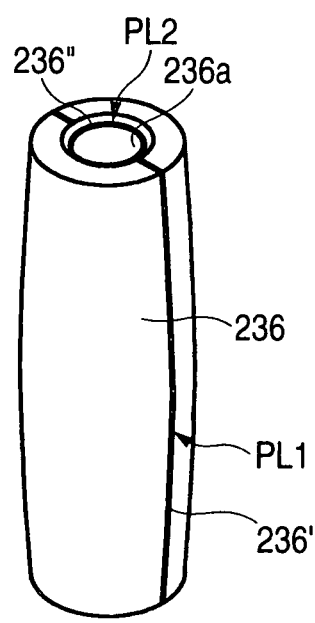
FIG. 9 is a perspective view showing a finished state of a guide roller which has been molded by employing the molds in FIG. 8.

FIG. 9 shows the guide roller 236 which has been molded through the above described injection molding process. The guide roller 236 has been molded substantially into a shape of a finished product having accuracy according to accuracy of the molds and abutting precision, except that a molding burr 236' along the aforesaid parting line PL1 is projected along a half divided position on an arc-shaped face and a half divided position on an end face, and a second circular molding burr 236" is projected along a tapered edge of one of the openings of the pin hole 236a.

Therefore, in a subsequent process, the molding burr 236' will be removed by applying a cutting edge along the arc-shaped face and by cutting, and the second annular molding burr 236" will be also removed by an end face treatment.

Although there are more molding burrs formed in this fifth embodiment than in the fourth embodiment, it is advantageous that precision test and shape modification can be performed at the same time in the subsequent process, with a less cutting amount and in a shorter working time, as compared with the conventional case in which a molded article in a shape of a straight cylinder has been machined into a barrel-like shape.

The invention is not restricted to the above described embodiments, but appropriate modifications and improvements are possible. For example, it is apparent that an object of application of the invention is not limited to a beta cam cassette, but any cassette having barrel shaped guide rollers formed of resin can be the object of the application.

INDUSTRIAL APPLICABILITY

As described herein above, in the magnetic tape cassettes according to the invention, the positional restriction of the magnetic tape can be conducted in a stable manner while maintaining a certain tension even in a large cassette, because differences between the heights of the radially inner portions of the lower flanges and the heights of the ribs in the lower halves for restricting the height of the magnetic tapes are equal in a plurality of the magnetic tape cassettes which are equal in vertical size and different in size in a horizontal direction.

Consequently, the magnetic tape will not be slackened, and damages of the tape edges can be prevented.

Moreover, according to the invention, because the tape running paths connecting the bosses around which the magnetic tapes are wound and the aforesaid guide members have the same inclinations, even in a plurality of magnetic tape cassettes having different outer sizes, the tape running areas in the recording and reproducing apparatus will not be enlarged to a large extent, even though the outer sizes are increased.

Further, according to the invention, because a pair of the tape running openings have the same width in a horizontal direction of the cassette, even in the plurality of the magnetic tape cassettes having different outer sizes, the tape running areas in the recording and reproducing apparatus will not be enlarged to a large extent, even though the outer sizes are increased.

Therefore, it will be possible to provide additional members near the tape running openings in the recording and reproducing apparatus, and the recording and reproducing apparatus will not be upsized by providing the members.

In the process for producing the guide roller in the magnetic tape cassette according to the invention, the parting line between the molds for injection molding is positioned at the largest diameter portion of the guide roller so as to mold it into a barrel-like shape, and thereafter, the molding burr projected from the parting line is removed, or the parting line between the molds for injection molding is positioned at both ends of the guide roller so as to mold it into a barrel-like shape, and thereafter, the molding burr projected from the parting line is removed. Therefore, the guide roller can be directly molded into the barrel-like shape by injection molding, with the simple subsequent process, and can be manufactured at a low cost.

What is claimed is:

1. Magnetic tape cassettes in combination with a recording and reproducing apparatus which can commonly operate a plurality of sizes of the magnetic tape cassettes, the recording and reproducing apparatus having common positioning pins for commonly positioning the plurality of sizes of the magnetic tape cassettes inside the recording and reproducing apparatus, and each of the magnetic tape cassettes comprising:

a magnetic tape for storing data;

tape reels respectively provided with bosses around which the magnetic tape is wound;

upper and lower flanges for restricting vertical movement of the magnetic tape as it is wound around the tape reels, said lower flange having a radially inner portion;

upper and lower halves for rotatably accommodating said tape reels, said lower half respectively having ribs at a front end of the lower half, in such a manner that said magnetic tape is restricted in height by said lower flange and the ribs; and positioning marks provided in each of the magnetic tape cassettes for receiving the common positioning pins of the recording and reproducing apparatus, where a distance between the positioning marks are the same for each of the magnetic tape cassettes, wherein a size relationship among the magnetic tape cassettes is such that each of the magnetic tape cassettes has a substantially similar vertical length while a horizontal length varies among each of the magnetic tape cassettes, and wherein a difference between a height of the radially inner portion and a height of the ribs is the same for each of the varying size magnetic tape cassettes;

wherein at least one of the upper and lower halves having a pair of guide members for defining a tape running area of tape running openings, and wherein:

distances between the pair of guide members vary among each of the magnetic tape cassettes, and inclinations defined by tape running paths that are defined by connecting the bosses and said guide members, are the same for each of the varying size magnetic tape cassettes.

2. The magnetic tape cassettes in combination with the recording and reproducing apparatus according to claim 1, wherein widths of the pair of tape running openings in a horizontal direction of said cassettes are the same for each of the varying size magnetic tape cassettes, and distances between the pair of guide members for restricting tape running areas of said tape running openings at inner sides of the cassettes, vary among each of the magnetic tape cassettes.

3. The magnetic tape cassettes in combination with the recording and reproducing apparatus according to claim 2, wherein the plurality of sizes of the magnetic tape cassettes include at least two of S, M, L and LL cassettes.

4. The magnetic tape cassettes in combination with the recording and reproducing apparatus according to claim 1, wherein the plurality of sizes of the magnetic tape cassettes include at least two of S, M, L and LL cassettes.

5. Magnetic tape cassettes in combination with a recording and reproducing apparatus which can commonly operate a plurality of sizes of the magnetic tape cassettes, the recording and reproducing apparatus having common positioning pins for commonly positioning the plurality of sizes of the magnetic tape cassettes inside the recording and reproducing apparatus, and each of the magnetic tape cassettes comprising:

a magnetic tape for storing data;

tape reels respectively provided with bosses around which the magnetic tape is wound;

upper and lower flanges for restricting vertical movement of the magnetic tape as it is wound around the tape reels;

upper and lower halves for rotatably accommodating said tape reels, said upper and lower halves defining a pair of tape running openings through which said magnetic tape runs, and at least one of the upper and lower halves having a pair of guide members for defining a tape running area of the tape running openings; and positioning marks provided in each of the magnetic tape cassettes for receiving the common positioning pins of the recording and reproducing apparatus, wherein a size relationship among the magnetic tape cassettes is such that horizontal lengths of each of the magnetic tape cassettes vary among the magnetic tape cassettes, and wherein distances between the positioning marks are the same for each of the varying size magnetic tape cassettes, distances between the pair of guide members vary among each of the magnetic tape cassettes, and inclinations defined by tape running paths that are defined by connecting the bosses and said guide members are the same for each of the varying size magnetic tape cassettes.

6. Magnetic tape cassettes in combination with a recording and reproducing apparatus which can commonly operate a plurality of sizes of the magnetic tape cassettes, the recording and reproducing apparatus having common positioning pins for commonly positioning the plurality of sizes of the magnetic tape cassettes inside the recording and reproducing apparatus, and each of the magnetic tape cassettes comprising:

a magnetic tape for storing data;

tape reels respectively provided with bosses around which the magnetic tape is wound;

upper and lower flanges for restricting vertical movement of the magnetic tape as it is wound around the tape reels;

upper and lower halves for rotatably accommodating said tape reels, said upper and lower halves defining a pair of tape running openings through which said magnetic tape runs, and at least one of the upper and lower halves having a pair of guide members for defining a tape running area of the tape running openings; and positioning marks provided in each of the magnetic tape cassettes for receiving the common positioning pins of the recording and reproducing apparatus, wherein the horizontal length varies among each of the magnetic tape cassettes, distances between positioning marks are the same for each of the varying size magnetic tape cassettes, widths of the pair of tape running openings in a horizontal direction of said cassettes are the same for each of the varying size magnetic tape cassettes, and distances between the pair of guide members for restricting tape running areas of said tape running openings at inner sides of the cassettes vary among each of the magnetic tape cassettes.

7. Magnetic tape cassettes in combination with a recording and reproducing apparatus which can commonly operate a plurality of sizes of the magnetic tape cassettes, the recording and reproducing apparatus having common positioning pins for commonly positioning the plurality of sizes of the magnetic tape cassettes inside the recording and reproducing apparatus, and each of the magnetic tape cassettes comprising:

a magnetic tape for storing data;

tape reels respectively provided with bosses around which the magnetic tape is wound;

upper and lower flanges for restricting vertical movement of the magnetic tape as it is wound around the tape reels, said lower flange having a radially inner portion;

upper and lower halves for rotatably accommodating said tape reels, said lower half respectively having ribs at its front end in such a manner that said magnetic tape is restricted in height by said lower flange and the ribs; and positioning marks provided in a first one of the magnetic tape cassettes and at least one additional one of the magnetic tape cassettes for receiving the common positioning pins of the recording and reproducing apparatus, where distances between the positioning marks are the same for the first magnetic tape cassette and the at least one additional magnetic tape cassette, wherein a vertical height of the first magnetic tape cassette is substantially equal to a vertical height of the at least one additional magnetic tape cassette, wherein a horizontal length of the first magnetic tape cassette is different than the horizontal length of the at least one additional magnetic tape cassette, and wherein a difference between a height of the radially inner portion of the first magnetic tape cassette and a height of a rib of the first magnetic tape cassette is substantially equal to a difference between a height of the radially inner portion of the at least one additional magnetic tape cassette and a height of a rib of the at least one additional magnetic tape cassette;

wherein at least one of the upper and lower halves have a pair of guide members for defining a tape running area of tape running openings, and wherein:

distances between the pair of guide members vary among the first magnetic tape cassette and the at least one additional magnetic tape cassette, and inclinations defined by tape running paths that are defined by connecting the bosses and said guide members are the same for the first magnetic tape cassette and the at least one additional magnetic tape cassette.

8. The magnetic tape cassettes in combination with the recording and reproducing apparatus according to claim 7, wherein:

widths of the pair of tape running openings in a horizontal direction of said magnetic tape cassettes are the same for the first magnetic tape cassette and the at least one additional magnetic tape cassette, and distances between the pair of guide members for restricting tape running areas of said tape running openings at inner sides of the magnetic tape cassettes vary among the first magnetic tape cassette and the at least one additional magnetic tape cassette.

9. The magnetic tape cassettes in combination with the recording and reproducing apparatus according to claim 8, wherein the plurality of sizes of the magnetic tape cassettes include at least two of S, M, L and LL cassettes.

10. The magnetic tape cassettes in combination with the recording and reproducing apparatus according to claim 7, wherein the plurality of sizes of the magnetic tape cassettes include at least two of S, M, L and LL cassettes.

11. Magnetic tape cassettes in combination with a recording and reproducing apparatus which can commonly operate a plurality of sizes of the magnetic tape cassettes, the recording and reproducing apparatus having common positioning pins for commonly positioning the plurality of sizes of the magnetic tape cassettes inside the recording and reproducing apparatus, and each of the magnetic tape cassettes comprising:

a magnetic tape for storing data;

tape reels respectively provided with bosses around which the magnetic tape is wound;

upper and lower flanges for restricting vertical movement of the magnetic tape as it is wound around the tape reels;

upper and lower halves for rotatably accommodating said tape reels, said upper and lower halves defining a pair of tape running openings through which said magnetic tape runs, and at least one of the upper and lower halves having a pair of guide members for defining a tape running area of the tape running openings; and positioning marks provided in a first one of the magnetic tape cassettes and at least one additional one of the magnetic tape cassettes for receiving the common positioning pins of the recording and reproducing apparatus, wherein a size relationship among the magnetic tape cassettes is such that horizontal lengths of the first magnetic tape cassette varies from the at least one additional magnetic tape cassette, and wherein:

distances between positioning marks are the same for the first magnetic tape cassette and the at least one additional magnetic tape cassette, distances between the pair of guide members vary among the first magnetic tape cassette and the at least one additional magnetic tape cassette, and inclinations defined by tape running paths that are defined by connecting the bosses and said guide members are the same for the first magnetic tape cassette and the at least one additional magnetic tape cassette.

12. Magnetic tape cassettes in combination with a recording and reproducing apparatus which can commonly operate a plurality of sizes of the magnetic tape cassettes, the recording and reproducing apparatus having common positioning pins for commonly positioning the plurality of sizes of the magnetic tape cassettes inside the recording and reproducing apparatus, and each of the magnetic tape cassettes comprising:

a magnetic tape for storing data;

tape reels respectively provided with bosses around which the magnetic tape is wound;

upper and lower flanges for restricting vertical movement of the magnetic tape as it is wound around the tape reels;

upper and lower halves for rotatably accommodating said tape reels, said upper and lower halves defining a pair of tape running openings through which said magnetic tape runs, and at least one of the upper and lower halves having a pair of guide members for defining a tape running area of the tape running openings; and positioning marks provided in a first one of the magnetic tape cassettes and at least one additional one of the magnetic tape cassettes for receiving the common positioning pins of the recording and reproducing apparatus, wherein the horizontal length varies among the first magnetic tape cassette and the at least one additional magnetic tape cassette, distances between positioning marks are the same for the first magnetic tape cassette and the at least one additional magnetic tape cassette, widths of the pair of tape running openings in a horizontal direction of said magnetic tape cassettes are the same for the first magnetic tape cassette and the at least one additional magnetic tape cassette, and distances between the pair of guide members for restricting tape running areas of said tape running openings at inner sides of the magnetic tape cassettes vary among the first magnetic tape cassette and the at least one additional magnetic tape cassette.

13. Magnetic tape cassettes in combination with a recording and reproducing apparatus which can commonly operate a plurality of sizes of the magnetic tape cassettes, the recording and reproducing apparatus having common positioning pins for commonly positioning the plurality of sizes of the magnetic tape cassettes inside the recording and reproducing apparatus, and each of the magnetic tape cassettes comprising:

a magnetic tape for storing data;

tape reels respectively provided with bosses around which the magnetic tape is wound;

upper and lower flanges for restricting vertical movement of the magnetic tape as it is wound around the tape reels; and upper and lower halves for rotatably accommodating said tape reels, said upper and lower halves defining a pair of tape running openings through which said magnetic tape runs, and at least one of the upper and lower halves having a pair of guide members for defining a tape running area of the tape running openings; and positioning marks provided in a first one of the magnetic tape cassettes and at least one additional one of the magnetic tape cassettes for receiving the common positioning pins of the recording and reproducing apparatus, where distances between the positioning marks are the same for the first magnetic tape cassette and the at least one additional magnetic tape cassette, wherein the horizontal length varies among the first magnetic tape cassette and the at least one additional magnetic tape cassette, widths of the pair of tape running openings in a horizontal direction of said magnetic tape cassettes are the same for each of the first magnetic tape cassette and the at least one additional magnetic tape cassette, and distances between the pair of guide members for restricting tape running areas of said tape running openings at inner sides of the magnetic tape cassettes vary among the first magnetic tape cassette and the at least one additional magnetic tape cassette.

* * * * *